(12) United States Patent
Shi et al.

(10) Patent No.: US 11,469,684 B2
(45) Date of Patent: Oct. 11, 2022

(54) ACTIVE DAMPING OF SOFT SWITCHING RESONANT CONVERTERS

(71) Applicant: ABB Schweiz AG, Baden (CH)

(72) Inventors: Yuxiang Shi, Raleigh, NC (US); Yu Du, Raleigh, NC (US); Eddy Aeloiza, Apex, NC (US)

(73) Assignee: ABB Schweiz AG, Baden (CH)

(*) Notice: Subject to any disclaimer, the term of this patent is extended or adjusted under 35 U.S.C. 154(b) by 301 days.

(21) Appl. No.: 16/899,217

(22) Filed: Jun. 11, 2020

(65) Prior Publication Data

US 2021/0391782 A1 Dec. 16, 2021

(51) Int. Cl.
| | |
|---|---|
| H02M 7/48 | (2007.01) |
| H02M 1/08 | (2006.01) |
| H02M 1/15 | (2006.01) |
| H02M 7/537 | (2006.01) |
| H02M 1/00 | (2006.01) |

(52) U.S. Cl.
CPC ......... *H02M 7/4815* (2021.05); *H02M 1/083* (2013.01); *H02M 1/15* (2013.01); *H02M 7/4811* (2021.05); *H02M 7/4818* (2021.05); *H02M 7/537* (2013.01); *H02M 1/0058* (2021.05)

(58) Field of Classification Search
CPC ...... H02M 7/4815; H02M 1/083; H02M 1/15; H02M 7/4811; H02M 7/4818; H02M 1/0058; H02M 3/156; H02M 7/797; H02M 7/537–5395

See application file for complete search history.

(56) References Cited

U.S. PATENT DOCUMENTS

| | | | | |
|---|---|---|---|---|
| 3,487,289 A | * | 12/1969 | McMurray | H02M 7/523 363/136 |
| 5,047,913 A | * | 9/1991 | De Doncker | H02M 7/5152 363/138 |
| 5,113,337 A | * | 5/1992 | Steigerwald | H02M 3/3376 363/40 |

(Continued)

OTHER PUBLICATIONS

Aydemir et al., "A Critical Evaluation of High Power Hard and Soft Switched Isolated DC-DC Converters," *Conference Record of the 2002 IEEE Industry Applications Conference—37th IAS Annual Meeting 2002*, vol. 2: 1338-1345 (Oct. 13-18, 2002).

(Continued)

*Primary Examiner* — Yusef A Ahmed

(74) *Attorney, Agent, or Firm* — Leydig, Voit & Mayer, Ltd.

(57) ABSTRACT

A soft switching resonant converter is disclosed. The converter includes a power switch operable to connect and disconnect a DC link rail node and an output node. A resonant capacitor is coupled with the power switch. An auxiliary leg is coupled with a DC link midpoint node and the output node. An active damper is coupled in series with the resonant capacitor and the output node and is controllable to provide a first resistance of the active damper in a first state and a second resistance of the active damper in a second state, the first resistance having a lower magnitude than the second resistance. A driver controls the damper switch to provide a first resistance during the soft switching operation of the power switch and a second resistance after the soft switching operation of the power switch.

18 Claims, 9 Drawing Sheets

(56) References Cited

U.S. PATENT DOCUMENTS

| | | | | | |
|---|---|---|---|---|---|
| 5,172,309 | A | * | 12/1992 | DeDoncker | H02M 7/4826 363/138 |
| 5,559,685 | A | * | 9/1996 | Lauw | H02M 7/4826 363/37 |
| 5,568,368 | A | * | 10/1996 | Steigerwald | H02M 3/337 363/17 |
| 5,592,371 | A | * | 1/1997 | Rajashekara | H02M 7/4826 363/132 |
| 5,594,634 | A | * | 1/1997 | Rajashekara | H02M 7/4826 363/132 |
| 5,642,273 | A | * | 6/1997 | Lai | H02M 7/5387 363/56.12 |
| 5,710,698 | A | * | 1/1998 | Lai | H03K 17/08148 363/56.05 |
| 6,091,615 | A | * | 7/2000 | Inoshita | H02M 7/53873 363/40 |
| 6,111,770 | A | * | 8/2000 | Peng | H02M 7/4826 363/138 |
| 7,230,838 | B2 | | 6/2007 | Xu | |
| 8,462,524 | B2 | * | 6/2013 | Gekeler | H02M 7/487 363/138 |
| 8,797,017 | B2 | | 8/2014 | Babb | |
| 8,816,592 | B2 | | 8/2014 | Eom et al. | |
| 8,907,639 | B2 | | 12/2014 | Holloway et al. | |
| 2004/0239298 | A1 | * | 12/2004 | Norrga | H02M 7/487 323/282 |
| 2006/0109694 | A1 | * | 5/2006 | Peng | H02M 7/4826 363/37 |
| 2008/0013351 | A1 | * | 1/2008 | Alexander | H02M 5/225 363/123 |
| 2008/0046204 | A1 | * | 2/2008 | Jungreis | H02M 3/01 702/57 |
| 2009/0225569 | A1 | * | 9/2009 | Begalke | H02M 7/25 363/17 |
| 2013/0049885 | A1 | | 2/2013 | Rozman et al. | |
| 2014/0177294 | A1 | * | 6/2014 | Lindholm | H02M 5/42 363/39 |
| 2015/0244284 | A1 | * | 8/2015 | Fu | H02M 7/537 363/41 |
| 2017/0163153 | A1 | * | 6/2017 | Lin | H03K 17/164 |
| 2017/0237339 | A1 | * | 8/2017 | Young | H02M 1/38 363/126 |
| 2017/0302068 | A1 | * | 10/2017 | Kubouchi | H02M 3/158 |
| 2017/0338748 | A1 | * | 11/2017 | Liang | H02M 3/33569 |
| 2018/0034362 | A1 | * | 2/2018 | Kubouchi | H02M 1/14 |
| 2019/0379288 | A1 | * | 12/2019 | Chaput | H02M 3/1582 |
| 2020/0007022 | A1 | * | 1/2020 | De Doncker | H02M 1/088 |
| 2020/0292629 | A1 | * | 9/2020 | He | H02M 7/537 |

OTHER PUBLICATIONS

Barbi et al., "A half-bridge zero-voltage switching pulse-width modulated DC-to-DC converter," [*Proceedings*] *APEC '91: Sixth Annual Applied Power Electronics Conference and Exhibition IEEE*, pp. 140-145 (Mar. 10-12, 1991).

Hui et al., "Resonant and Soft-switching Converters," *Power Electronics Handbook*, Chapter 16: 409-453 (2011).

Voss et al., "Full Soft-Switching Capability of the Dual-Active Bridge by Using the Auxiliary-Resonant Commutated-Pole Technique," *2017 IEEE 8th International Symposium on Power Electronics for Distributed Generation Systems* (*PEDG*), pp. 1-8 (Apr. 17-20, 2017).

European Patent Office, Extended European Search Report in European Application No. 21178551.4, 10 pp. (dated Oct. 21, 2021).

Dong, Wei et al. "Analysis and Evaluation of Soft-Switching Inverter Techniques in Electric Vehicle Applications", Virginia Polytechnic Institute and State University,Dissertation, Apr. 22, 2003, 259 pgs.

Ohsugi, Mitsutoshi et al., "The Analyses of ZVS Turn-Off Loss and the New Snubber Circuit for the ARCP Inverter", 20th Annual Conference of IEEE Industrial Electronics, Sep. 5, 1994, 6 pgs.

* cited by examiner

ACTIVE DAMPING OF SOFT SWITCHING RESONANT CONVERTERS

TECHNICAL FIELD

The present application relates to soft switching resonant converters, such as Auxiliary Resonant Commutated Pole Inverters (ARCPI), and more particularly, but not exclusively to damping current and voltage ringing in commutation loops of such converters.

BACKGROUND

Soft switching converters, such as ARCPI, offer benefits relative to hard switching converters including lower switching loss and increased suitability for high-frequency switching applications. Such converters face a number of difficulties, however, such as undesirable voltage or current oscillation sometimes referred to as voltage and current ringing. A number of efforts have been made to mitigate voltage and current circuit ringing. Certain approaches seek to utilize a small resonant capacitor with an inherently high damping factor and ringing frequency. However, such approaches are insufficient for applications where large resonant capacitors are needed and commutation loop inductance cannot be minimized. In such applications, the voltage and current ringing may be much worse due to lower ringing frequency and lower damping factor. Furthermore, for proper operation under high switching frequency, additional damping is needed. There remains a substantial unmet need for the unique apparatuses, methods, and systems disclosed herein.

DISCLOSURE OF EXAMPLE EMBODIMENTS

For the purposes of clearly, concisely and exactly describing example embodiments of the present disclosure, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

One example embodiment is a unique to soft switching resonant converter including an active damper. Another example embodiment is a unique method of operating a soft switching resonant converter including an active damper. Another example embodiment is a unique system comprising a soft switching resonant converter including an active damper. Further embodiments, forms, objects, features, advantages, aspects, and benefits shall become apparent from the following description and drawings.

DETAILED DESCRIPTION OF EXAMPLE EMBODIMENTS

Figure 1:
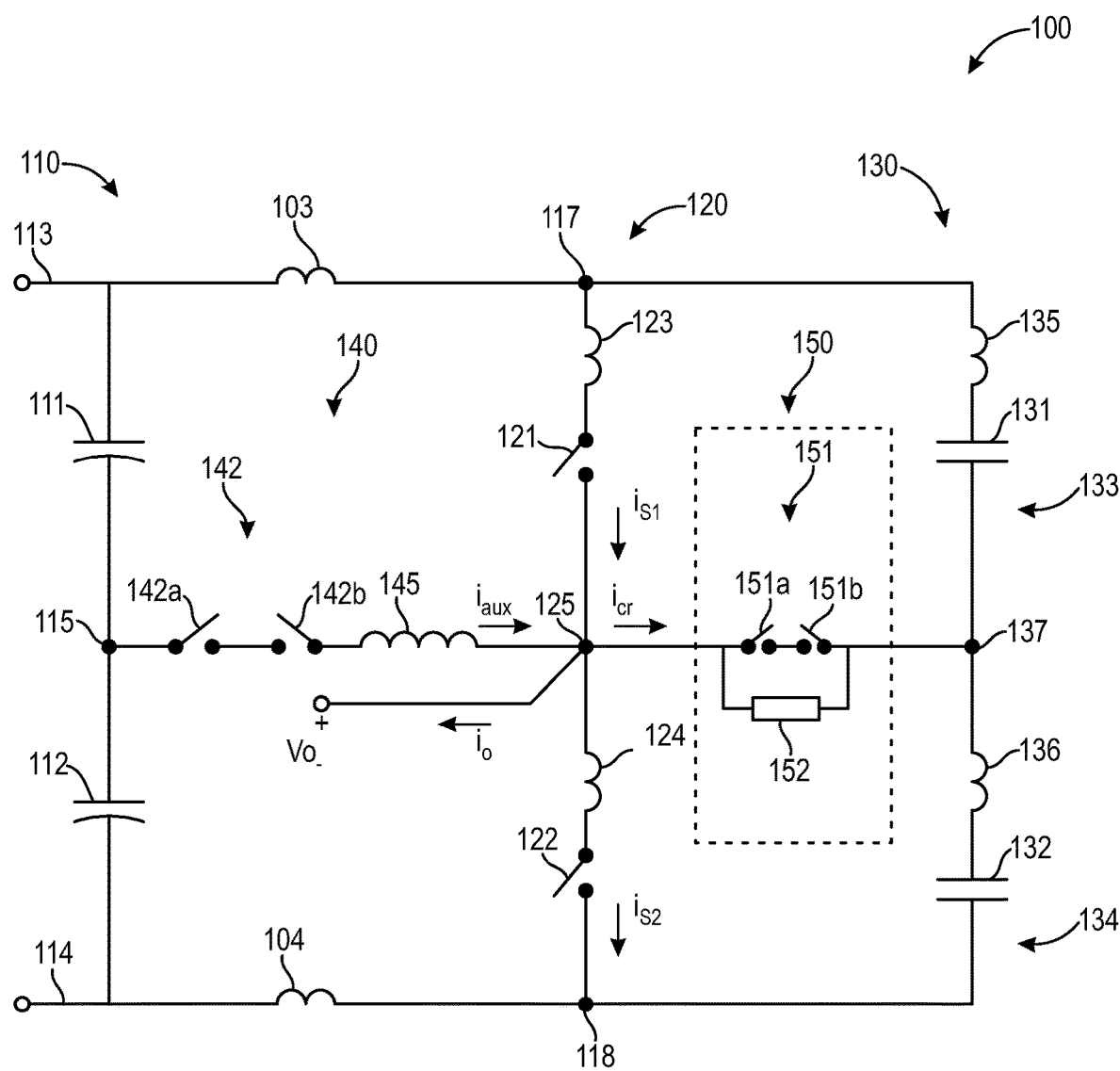
FIG. 1 is a schematic circuit diagram depicting certain aspects of soft switching resonant converter circuitry according to an example embodiment.

With reference to FIG. 1, there is illustrated an example embodiment of soft switching resonant converter circuitry 100 (also referred to herein as circuitry 100). In the illustrated embodiment, circuitry 100 is configured as an auxiliary resonant commutated pole (ARCP) inverter (also referred to herein as an ARCPI). It shall be appreciated that in other embodiments circuitry 100 may be configured as a number of other types of soft switching resonant converters including, for example, resonant load inverters, resonant link inverters, resonant pole inverters or other types of soft switching resonant converters. It shall be appreciated that ARCP converters comprise a number of converter types which utilize auxiliary poles to achieve soft switching, and are not limited to the illustrated embodiments. Other embodiments include poles comprising a number of different structures and connections. Furthermore, the disclosure contemplates a number of architectures and configurations of soft switching resonant converters where a capacitor, sometimes referred to as a resonant capacitor or snubber capacitor, is provided in a parallel relationship with a semiconductor switch wherein the disclosed active damping circuity architectures can be applied in a commutation loop between a switch and a capacitor. Accordingly, it shall be appreciated that the description of the illustrated aspects of circuitry 100 are applicable to related aspects of such other converters as understood by one of skill in the art with the benefit of the present disclosure.

Circuitry 100 includes a DC link 110 comprising a first DC link capacitor 111 coupled with first DC link rail 113 and a DC link midpoint 115, and a second DC link capacitor 112 coupled with a second DC link rail 114 and the DC link midpoint 115. During operation, the first DC link rail 113 is at a first voltage, the second DC link rail 114 is at a second voltage lower than the first DC voltage, and the DC link midpoint 115 is at a midpoint voltage. The first DC link rail 113 includes an equivalent series inductance (ESL) 103 which is an inherent or parasitic inductance of first DC link rail 113 rather than a discrete inductor. The second DC link rail 114 includes an ESL 104 which is an inherent or parasitic inductance of first DC link rail 114 rather than a discrete inductor.

It shall be appreciated that DC link 110 may be provided in a number of forms and may have a number of voltages and other attributes. Certain embodiments comprise low voltage (LV) applications where voltage difference between positive and negative DC link rails (e.g., DC link rail 113 and DC link rail 114) may be between 50 to 1000 VDC. In other embodiments, higher voltage levels in the range of several kV are contemplated. Further embodiments contemplate a variety of other voltage magnitudes and differences. It shall also be appreciated that the voltage difference between positive and negative DC link rails (e.g., DC link rail 113 and DC link rail 114) is flexible, depending on how the DC link 110 is fed. For example, some embodiments may use a front-end isolation transformer and rectifier connected to the DC-link with the positive and negative rails floating and the differential voltage typically in the range of 50V-1500V, but in principle in other voltages outside this range as well. In other embodiments, the positive rail, mid-point, or negative rail may be grounded to earth. Preferably, the positive and negative rails (e.g., DC link rail 113 and DC link rail 114) are balanced. For example, if the DC link midpoint 115 is at 0 VDC, DC link rail 113 would be at a positive voltage (e.g., in the range of +25 VDC to +500 VDC, the range of in the range of +150 VDC to +400 VDC or other positive voltage ranges) and DC link rail 114 would be at a negative voltage corresponding to the positive voltage (e.g., in the range of −25 VDC to −500 VDC, the range of in the range of −150 VDC to −400 VDC or other negative voltage ranges corresponding to the other positive voltage ranges). It shall be appreciated that the foregoing examples are but a few of many voltage magnitudes and polarities that may be present in or associated with the operation of DC link 110. It shall be additionally appreciated that the voltage magnitudes of the foregoing examples may be subject to fluctuation, margins of error, tolerance, and other variations and may not be rigidly fixed to the precise example magnitudes stated. It shall be further appreciated the term bus may be utilized in place of the term link such that, for example, references to a DC link are understood to encompass a DC bus and vice versa.

Circuitry 100 includes a power section 120 including a first power switch 121 coupled with the first DC link rail 113 at a first DC link rail node 117 and with an AC load (not illustrated) at an output node 125, and a second power switch 122 coupled in series with the second DC link rail 114 a second DC link rail node 118 and the output node 125. First power switch 121 is operable to connect and disconnect the DC link rail node 117 and the output node 125 in response to control signals received from control and driver circuitry (not illustrated in FIG. 1). Second power switch 122 is operable to connect and disconnect the DC link rail node 118 and the output node 125 in response to control signals received from the control and driver circuitry. The first power switch 121 includes an ESL (equivalent series inductance) 123 which is an inherent or parasitic inductance of the first power switch 121 and the connection to the DC link rail 113 which corresponds to a portion of the total commutation loop inductance (rather than a discrete inductor). The second power switch 122 includes an ESL 124 which is an inherent or parasitic inductance of the second power switch 122 and the connection to the DC link rail 114 (rather than a discrete inductor).

When the first power switch 121 is closed (e.g., controlled to an on or conductive state), a first switch current $i_{s1}$ can flow between the DC link rail node 117 and the output node 125. Similarly, when the second power switch 122 is closed (e.g., controlled to an on or conductive state), a second switch current $i_{s2}$ can flow between the output node 125 and the DC link rail node 118. On the other hand, when the first power switch 121 is open (e.g., controlled to an off or non-conductive state), the first switch current $i_{s1}$ will not flow in the switch-forward direction between the DC link rail node 117 and the output node 125 (although current may flow in the switch-reverse direction through an anti-parallel diode of the first power switch 121). Similarly, when the second power switch 122 is open (e.g., controlled to an off or non-conductive state), the second switch current $i_{s2}$ will not flow in the switch-forward direction between the output node 125 and the DC link rail node 118 (although current may flow in the switch-reverse direction through an anti-parallel diode of the first power switch 122). Thus, by opening and closing the first power switch 121 and the second power switch 122, the load voltage at output node 125 will be controlled to be either the voltage from DC link rail 113 or DC link rail 114.

The first power switch 121 and the second power switch 122 may be provided in a number of forms including, for example, as semiconductor switching devices such as insulated gate bipolar transistors (IGBTs), metal oxide semiconductor field effect transistors (MOSFETs), silicon carbide metal oxide semiconductor field effect transistors (SiC MOSFETs), SiC junction gate field-effect transistor (SiC JFETs), gallium nitride high-electron-mobility transistors (GaN HEMTs), gallium nitride metal oxide semiconductor field effect transistors (GaN MOSFETs), or other types of power switching devices as understood by one of skill in the art with the benefit of the present disclosure. In certain forms, the first power switch 121 and the second power switch 122 are provided as IGBTs with a blocking voltage rating greater than the VDC, for example, 1.2 kV or in the range of 1 kV or greater.

Circuitry 100 includes a commutation section 130 including a first resonant capacitor 131 coupled in parallel with the first power switch 121 to provide a first commutation loop 133, and a second resonant capacitor 132 coupled in parallel with the second power switch 122 to provide a second commutation loop 134. The first resonant capacitor 131 includes an ESL 135 which is an inherent or parasitic inductance of the first resonant capacitor 131. The second resonant capacitor 132 includes an ESL 136 which is an inherent or parasitic inductance of the first resonant capacitor 131.

Circuitry 100 includes an auxiliary leg 140 coupled in series with the DC link midpoint node 115 and the output node 125. The auxiliary leg 140 includes an auxiliary switch 142 and an inductor 145. The auxiliary switch 142 is operable to connect and disconnect the DC link midpoint node 115 and the output node 125 in coordination with operation of the power switch 121 and the second power switch 122 to provide soft switching of the first and second power switches 121 and 122. In the illustrated embodiment the auxiliary switch 142 is a bi-directional switch including two switching devices 142a, 142b in an anti-series configuration or in series with opposite polarities. Switching devices 142a, 142b may be IGBTs, MOSFETs or other types of power switching devices as understood by one of skill in the art with the benefit of the present disclosure. In other embodiments, the auxiliary switch 142 may be a single-device bi-directional switch, such as a bi-directional gallium-nitride (GaN) switching device or a variety of other bi-directional controllable switch topologies, including, for example, the devices illustrated FIGS. 8-11 which are further described herein below.

When the auxiliary switch 142 is closed (e.g., controlled to an on or conductive state), an auxiliary current $i_{aux}$ can flow between the midpoint node 115 and the output node 125. On the other hand, when the auxiliary switch 142 is open (e.g., controlled to an off or non-conductive state), the auxiliary current $i_{aux}$ will not flow between midpoint node 115 and the output node 125. Similarly, when the second power switch 122 is open (e.g., controlled to an off or non-conductive state), the second switch current $i_{s2}$ will not flow between the output node 125 and the DC link rail node 118.

Circuitry 100 includes an active damper 150 coupled between the midpoint of capacitors 131-132 and the output node 125 and including a damper switch controllable to provide a first resistance of the active damper in a first switch state and a second resistance of the active damper in a second switch state, the first resistance having a lower magnitude than the second resistance. The active damper may be provided in a number of forms. In the embodiment illustrated in FIG. 1, the active damper 150 includes a bi-directional damper switch 151 (sometimes referred to herein as damper switch 151 or bi-directional switch 151) including first and second switching devices 151a, 151b arranged in an anti-series relationship and a damping resistor 152 provided in parallel with the first and second switching devices 151a, 151b. The first and second switching devices 151a, 151b may be MOSFET devices having blocking voltage rating in the range of 100 V to 200 V or about 20% of the DC bus voltage Vdc. It shall be appreciated that that use of such devices provides a significantly lower conduction loss relative to switching devices with higher voltage ratings such as the voltage ratings of the first power switch 121 and the second power switch 122 which may be, for example, 1200V.

When the first and second switching devices 151a, 151b are closed (e.g., controlled to an on or conductive state), the active damper 150 provides a bi-directional first resistance to resonant capacitor current $i_{C_r}$ which may be zero or near-zero, for example, the inherent resistance of the first and second switching devices 151a, 151b in the on or conductive state. When the first and second switching devices 151a, 151b are open (e.g., controlled to an off or non-conductive state), the active damper 150 provides a bi-directional second resistance to resonant capacitor current $i_{C_r}$ according to the value of damping resistor 152. In certain forms, the second resistance provided by damping resistor 152 may be, for example, 0.1-0.5 Ohms or other values depending on the current rating of the converters.

In other embodiments, the active damper 150 may be provided in a number of further forms. For example, in certain forms, the damping switch 151 may comprise a single bi-directional switching device, such as a gallium-nitride (GaN) transistor provided in parallel with damping resistor 152, rather than the first and second switching devices 151a, 151b. In certain forms, a tri-state device controllable to provide the first resistance in the first state and may be utilized to provide the second resistance in the second state rather than damping switch 151 and damping resistor 152. It shall be appreciated that the tri-state device may comprise a bi-directional switch such as bi-directional switch 151 without the resistance 152 wherein the bi-directional switch is controlled, by gate voltage/current in a tri-state way as oppose to traditional ON or OFF. The third state corresponds to an intermediate desired resistance value; higher than ON state and much lower than OFF state. It shall be further appreciated that the foregoing examples are but several examples of an active damper including a damper switch controllable to provide a first resistance of the active damper in a first switch state and a second resistance of the active damper in a second switch state, the first resistance having a lower magnitude than the second resistance and the active damper 150 contemplates further forms and variations as understood by one of skill in the art with the benefit of the present disclosure With reference to FIGS. 8-11, there are illustrated several further examples of bi-directional switches which may be utilized in place of bi-directional damping switch 151 of active damper 150, in place of auxiliary switch 142 of auxiliary leg 140, or in place of other switches according to the present disclosure.

Figure 8:
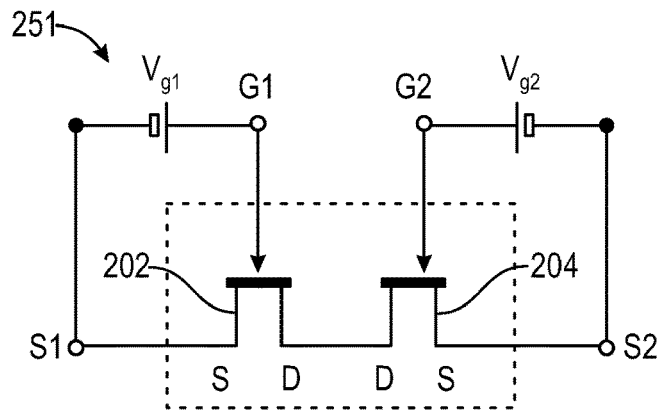
FIGS. 8-14 are schematic circuit diagrams depicting certain aspects of several example bi-directional switches.

FIG. 8 illustrates a bi-directional switch 251 which is one example of a gallium nitride (GaN)-based switch. Bi-directional switch 251 is a four-terminal GaN HMET device including first and second switch terminal nodes S1, S2, and first and second gate terminal nodes G1, G2. The source of GaN switching device portion 202 is coupled with switch terminal node S1, the source of GaN switching device portion 204 is coupled with switch terminal node S2, and the drains of GaN switching device portions 202, 204 are coupled to one another and may share the same drain region inside the GaN device to have lower on-state resistance. The first and second gate terminal nodes G1, G2 are coupled with respective first and second driver voltages $V_{g1}$, $V_{g2}$.

Figure 9:
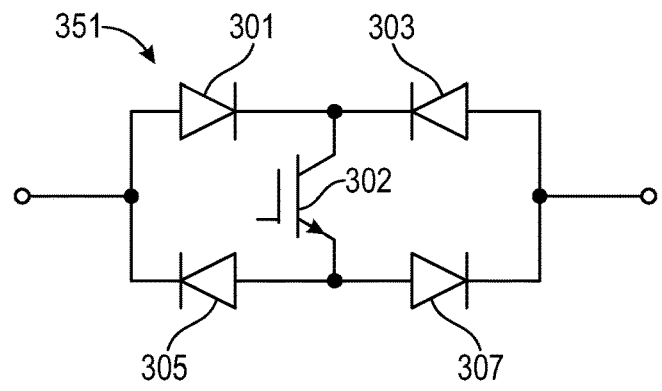

FIG. 9 illustrates a bi-directional switch 351 comprising dour diodes 301, 303, 305, 307, and a single IGBT switching device 302. The anode of diode 301 and the cathode of diode 305 are coupled with a first switch terminal node. The anode of diode 303 and the cathode of diode 307 are coupled with a second switch terminal node. The cathode of diode 301, the cathode of diode 303 and the collector of IGBT switching device 302 are coupled with a third node. The anode of diode 305, the anode of diode 307 and the emitter of IGBT switching device 302 are coupled with a fourth node.

Figure 10:
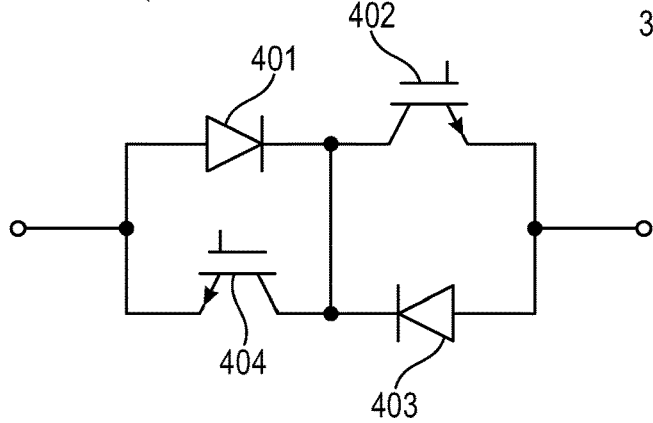

FIG. 10 illustrates a bi-directional switch 451 comprising IGBT switching devices 402, 404 and free-wheeling diodes 401, 403. The anode of diode 401 and the emitter of IGBT switching device 404 are coupled with a first switch terminal node. The anode of diode 403 and the emitter of IGBT switching device 402 are coupled with a second switch terminal node. The cathode of diodes 401, 403 and the collectors of IGBT switching device 402, 404 are coupled with a common central node.

Figure 11:
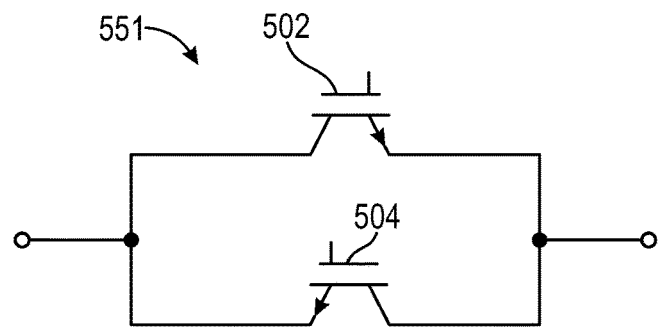

FIG. 11 illustrates a bi-directional switch 551 comprising two reverse blocking IGBT switching devices 502, 504 arranged in an anti-parallel configuration. The emitter of reverse blocking IGBT switching device 502 and the collector of reverse blocking IGBT switching device 504 are coupled to a first switch terminal node. The collector of reverse blocking IGBT switching device 502 and the emitter of reverse blocking IGBT switching device 504 are coupled to a second switch terminal node.

Figure 12:
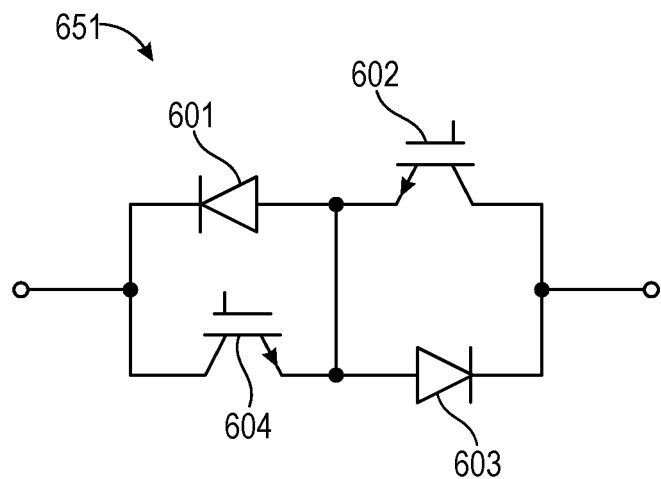

FIG. 12 illustrates common emitter form of a bi-directional switch 651 comprising reverse blocking IGBT switching devices 602, 604 and diodes 601, 603. The cathode of diode 601 and the collector of IGBT switching device 604 are coupled with a first switch terminal node. The cathode of diode 603 and the collector of IGBT switching device 602 are coupled with a second switch terminal node. The anodes of diodes 601, 603 and the emitters of IGBT switching device 602, 604 are coupled with a common central node. It is further contemplated that a common source form of a bidirectional switch analogous to the common emitter form of a bi-directional switch 651 may be utilized wherein the sources of MOSFETs or other FET device are coupled in a manner corresponding to the emitters IGBT switching device 602, 604 and the drains of MOSFETs or other FET device are coupled in a manner corresponding to the collectors IGBT switching device 602, 604.

Figure 13:
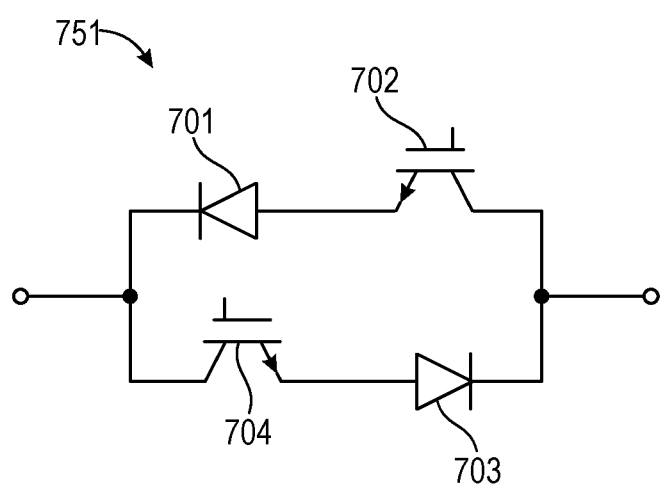

FIG. 13 illustrates another form of a bi-directional switch 751 comprising BJT switching devices 702, 704 and diodes 701, 703. The cathode of diode 701 and the collector of BJT switching device 704 are coupled with a first switch terminal node. The cathode of diode 703 and the collector of BJT switching device 702 are coupled with a second switch terminal node. Diode 701 is coupled in series with BJT switching device 702 with the anode of diode 701 coupled with the emitter of BJT switching device 702. Diode 703 is coupled in series with BJT switching device 704 with the anode of diode 703 coupled with the emitter of BJT switching device 704.

Figure 14:
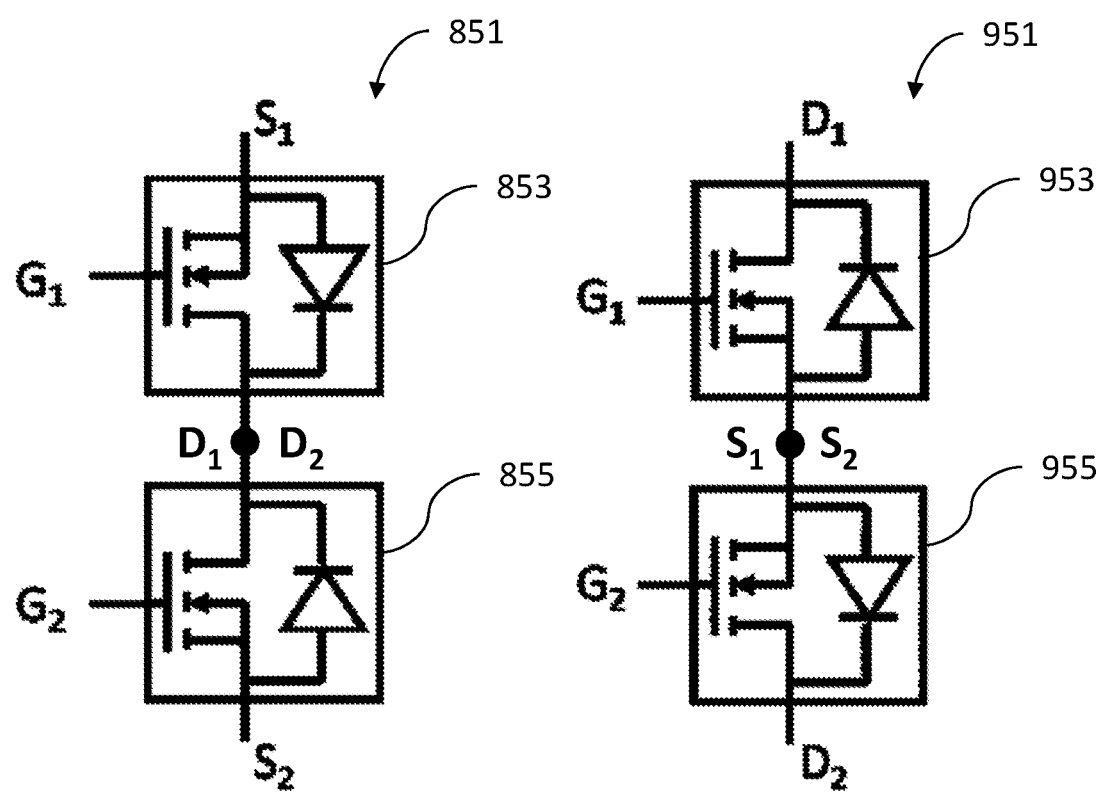

FIG. 14 illustrates additional forms of a bi-directional switch. Bidirectional switch 851 includes Si MOSFETs 853, 855 arranged in series in a common drain configuration with the drains of Si MOSFETs 853, 855 coupled at a common central node. Bidirectional switch 951 includes Si MOSFETs 953, 955 arranged in series in a common source configuration with the sources of Si MOSFETs 853, 855 coupled at a common central node. It shall be appreciated that Si MOSFETs 853, 855, 953, 955 do not utilize parasitic diodes or body diodes (e.g., an external diode like for IGBT) to conduct bidirectional current but instead use respective channels to conduct bidirectional current. Such forms may be preferred to provide lower loss as diodes have larger losses than the Si MOSFET channels. Bidirectional switches such as bidirectional switch 851, 951 provide lower losses with lower voltage ratings (e.g., with 20% voltage rating of main IGBT's.)

Figure 2:
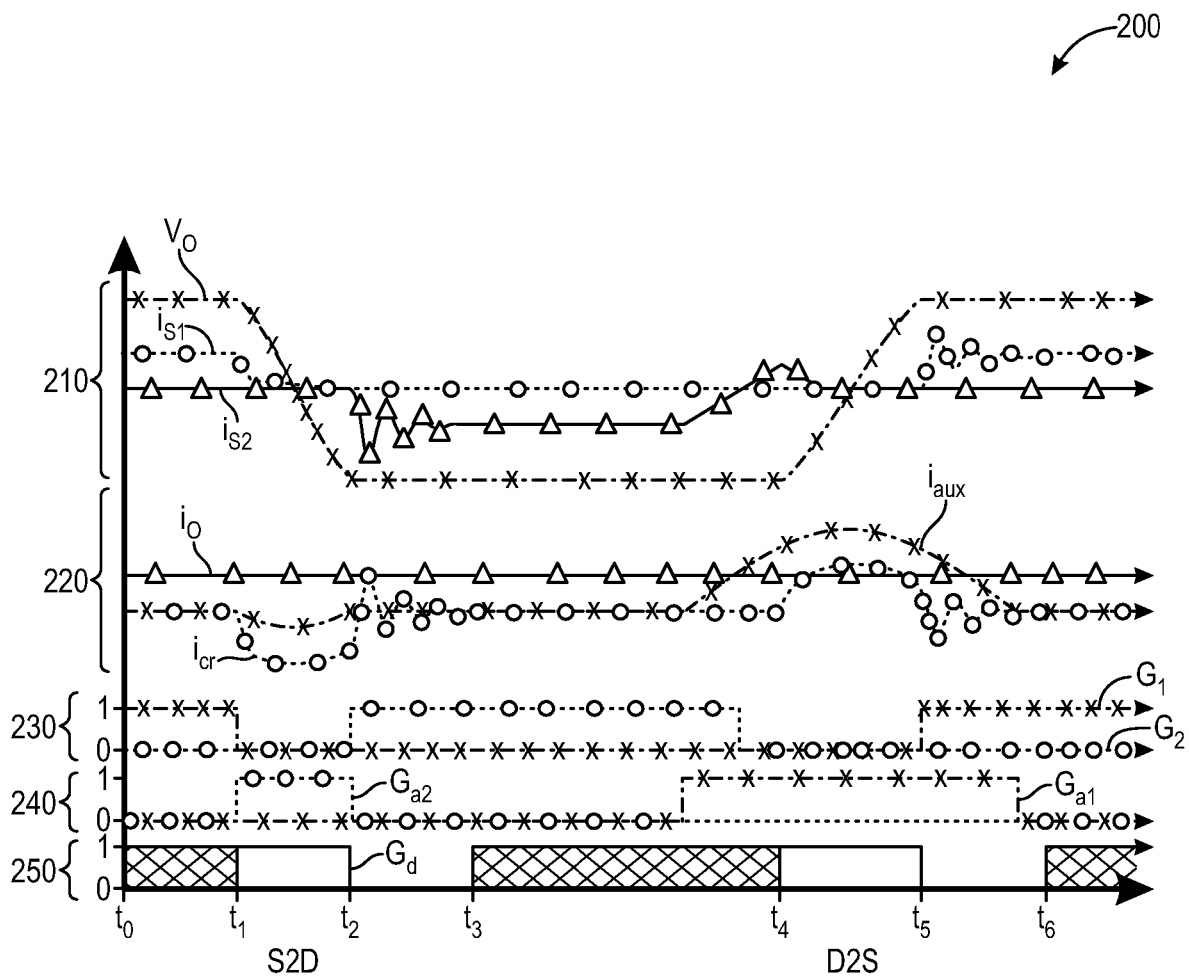
FIG. 2 is a signal timing diagram depicting certain aspects of the operation of soft switching resonant converter circuitry according to an example embodiment.

With reference to FIG. 2, there is illustrated a signal timing diagram 200 depicting certain aspects of the operation of soft switching resonant converter circuitry according to an example embodiment. Signal timing diagram 200 illustrates several sets of signals including signal set 210, signal set 220, signal set 230, signal set 240, and signal set 250. Signal set 210 illustrates output voltage signal $v_o$, first power switch current signal $i_{s1}$, and second power switch current signal $i_{s2}$. Output voltage signal $v_o$, is the voltage at an output node, such as output node 125 of circuitry 100 with respect to the DC-link capacitor mid-point 115. First power switch current signal $i_{s1}$ is the current through a first power switch such as power switch 121 of circuitry 100. Second power switch current signal $i_{s2}$ is the current through a second power switch such as power switch 122 of circuitry 100.

Signal set 220 illustrates output current signal $i_o$, resonant capacitor current signal $i_{Cr}$, and auxiliary current signal $i_{aux}$. Output current signal $i_o$ is the current flowing from an output node, such as output node 125 of circuitry 100, to a load connected thereto. Resonant capacitor current signal $i_{Cr}$ is the current flowing to a resonant capacitor, such as resonant capacitor 131 or resonant capacitor 132 of circuitry 100. Auxiliary current signal $i_{aux}$ is the current flowing through an auxiliary leg of a converter, such as auxiliary leg 140 of circuitry 100.

Signal set 230 illustrates first power switch driving logic signal $G_1$ a second power switch driving logic signal $G_2$. First power switch driving logic signal $G_1$ is provided to and used to control the operating state of a first power switch, such as first power switch 121 of circuitry 100. When the first power switch driving logic signal $G_1$ is at a logical high value ("1"), the first power switch is turned on (i.e., closed) and when the first power switch driving logic signal $G_1$ is at a logical low value ("0"), the first power switch is turned off (i.e., open). Second power switch driving logic signal $G_2$ is provided to and used to control the operating state of a second power switch 122. When the second power switch driving logic signal $G_2$ is at a logical high value ("1"), the second power switch is turned on (i.e., closed) and when the second power switch driving logic signal $G_2$ is at a logical low value ("0"), the second power switch is turned off (i.e., open).

Signal set 240 illustrates first auxiliary switch driving logic signal $G_{a1}$ and second auxiliary switch driving logic signal $G_{a2}$. First auxiliary switch driving logic signal $G_{a1}$ is provided to and used to control the operating state of a first auxiliary switch, such as switching device 142a of circuitry 100. When the first auxiliary switch driving logic signal $G_{a1}$ is at a logical high value ("1"), the first auxiliary switch is turned on (i.e., closed) and when the first auxiliary switch driving logic signal $G_{a1}$ is at a logical low value ("0"), the first auxiliary switch is turned off (i.e., open). Second auxiliary switch driving logic signal $G_{a2}$ is provided to and used to control the operating state of a second auxiliary switch, such as switching device 142b of circuitry 100. When the second auxiliary switch driving logic signal $G_2$ is at a logical high value ("1"), the second auxiliary switch is turned on (i.e., closed) and when the second auxiliary switch driving logic signal $G_2$ is at a logical low value ("0"), the second auxiliary switch is turned off (i.e., open).

Signal set 250 illustrates active damper driving logic signal $G_d$ which is provided to and used to control the operating state of an active damper switch, such as active damper switch 150 or more particularly to first and second switching devices 151a, 151b of circuitry 100. When the active damper driving logic signal $G_d$ is at a logical high value ("1"), the active damper switch is turned on (i.e., closed) and when the active damper driving logic signal $G_d$ is at a logical low value ("0"), the active damper switch is turned off (i.e., open). It shall be appreciated that signals $G_1$, $G_2$, $G_{a1}$, $G_{a2}$, and $G_d$ may also be considered and referred to as gate signal in embodiments where their respective switches comprise semiconductor devices including a gate input (e.g., IGBTs, MOSFETs, other field effect transistors, or other semiconductor devices including a gate).

Signal sets 230 and 240 are configured to control the aforementioned power and auxiliary switches to provide zero-voltage soft switching of first and second power switches, such as first and second power switches 211, 212 of circuitry 100, by providing the current and voltage signals illustrated in signals sets 210 and 220. Further details regarding the operation of the power switches and the auxiliary switches of an example soft switching resonant converter may be found in U.S. Pat. No. 7,411,797 the disclosure of is hereby incorporated by reference.

Signal set 250 is configured to control a damper switch, such as damper switch 151 of circuitry 100, to provide active damping of voltage and current ringing after the soft switching operation of the first and second power switches. From time $t_0$ to time $t_1$, the damper switch may be controlled to be either on (i.e., closed) or off (i.e., open) as either state will permit desired operation of the soft switching resonant converter circuitry.

Starting at time $t_1$ and continuing to time $t_2$, the damper switch is controlled to be on (i.e., closed) to provide a relatively low resistance of a magnitude permitting the soft switching operation to occur without interference of the active damper circuitry. For example, in this time period, a first power switch, such as power switch 121 of circuitry 100, may turn off (i.e., open) at a substantially zero voltage, a second power switch 122, such as power switch 122 of circuitry 100, may turn on (i.e., close) at a substantially zero voltage, and the resistance of the damper switch will provide de minimis, if any, impact on this soft switching operation and the relatively high resonant current peak that is utilized to provide such soft switching. Because it is desirable (while not essential) for the damper switch to be on (i.e., closed) for the entire time between time $t_1$ and $t_2$, the precise timing of the damper driving logic signal $G_d$ may be selected to ensure that the damper switch is on (i.e., closed) at or before time $t_1$.

Figure 3A:
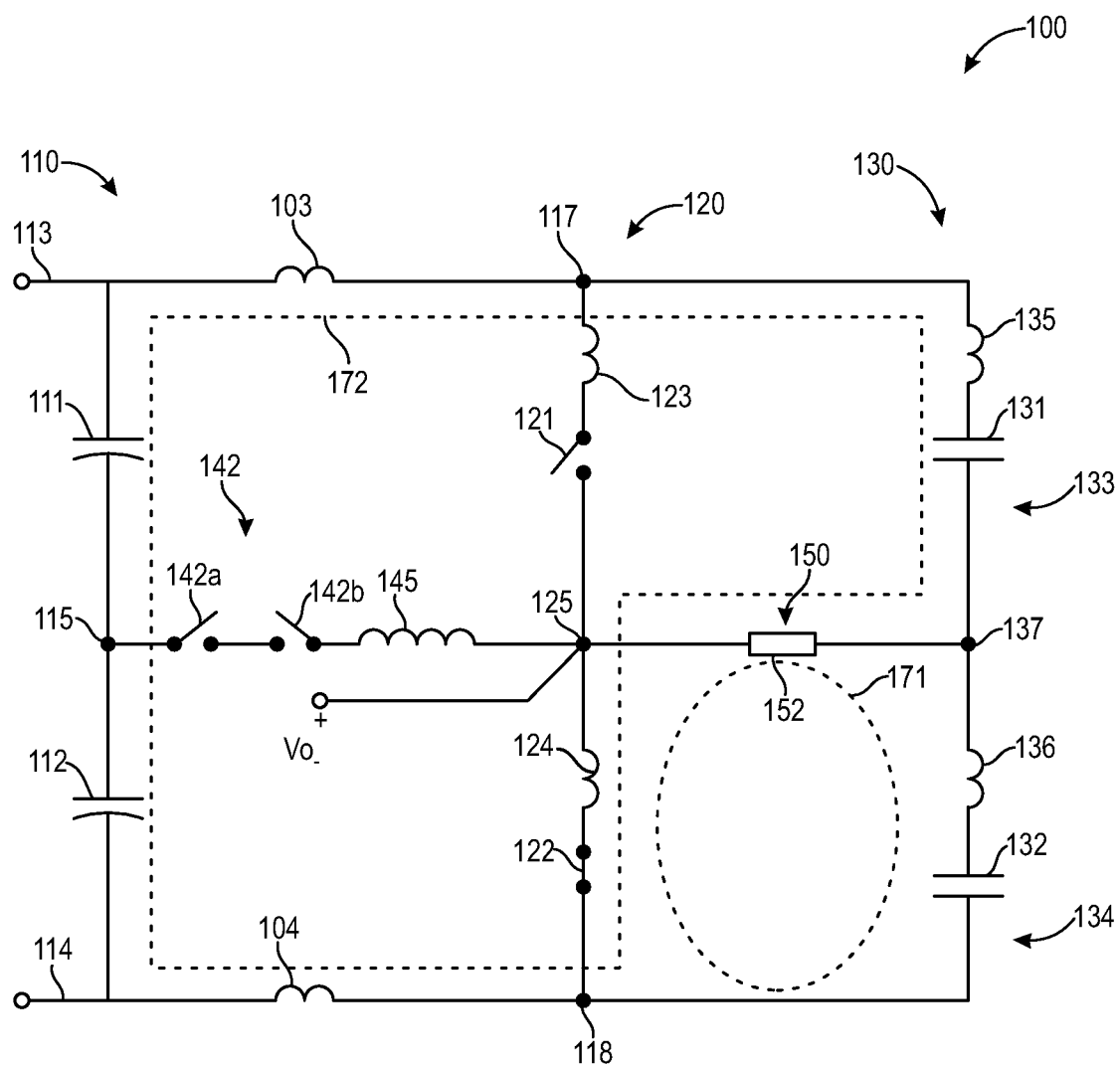
FIG. 3A is a schematic circuit diagram depicting certain aspects of an active damping operational state of the soft switching resonant converter circuitry of FIG. 1.

Starting at time $t_2$ and continuing to time $t_3$, the damper switch is controlled to be off (i.e., open) to provide relatively high resistance of a magnitude effective to damp current and voltage ringing in the soft switching resonant converter circuitry. For example, with reference to FIG. 3A, there is illustrated an operating state of circuitry 100 between time $t_2$ and time $t_3$ where the power switch 121 is controlled to be off (i.e., open), the power switch 122 is controlled to be on (i.e., closed), and the active damper 150 is controlled to provide the resistance of damping resistor 152 to attenuate current and voltage ringing in a first loop 171 and a second loop 172. As illustrated in FIG. 3A, the first loop 171 includes second power switch 122, the active damper 150, and the second commutation loop 134 (including the second resonant capacitor 132). Additionally, the second loop 172 includes the first DC link rail 113, a portion of the first commutation loop 133 including the first resonant capacitor 131, the active damper 150, the second power switch 122, the second DC link rail 114 and the DC link capacitors 111, 112.

From time $t_3$ to time $t_4$, the damper switch may be controlled to be either on (i.e., closed) or off (i.e., open) as either state will permit desired operation of the soft switching resonant converter circuitry. Starting at time $t_4$ and continuing to time $t_5$, when the commutation resonant current flows into the resonant capacitors 131 and 132, the damper switch is controlled to be on (i.e., closed) to provide a relatively low resistance of a sufficient magnitude to permit the soft switching operation to occur without interference of the active damper circuitry. For example, in this time period, a first power switch, such as power switch 121 of circuitry 100, may turn on (i.e., close) at a substantially zero voltage, a second power switch 122, such as power switch 122 of circuitry 100, may turn off (i.e., open) at a substantially zero voltage, and the resistance of the damper switch will provide de minimis, if any, impact on this soft switching operation and the relatively high resonant current peak that is utilized to provide such soft switching. Because it is desirable for the damper switch to be on (i.e., closed) for the entire time between time $t_4$ and $t_5$, the precise timing of the damper driving logic signal $G_d$ may be selected to ensure that the damper switch is on (i.e., closed) at or before time $t_4$.

Figure 3B:
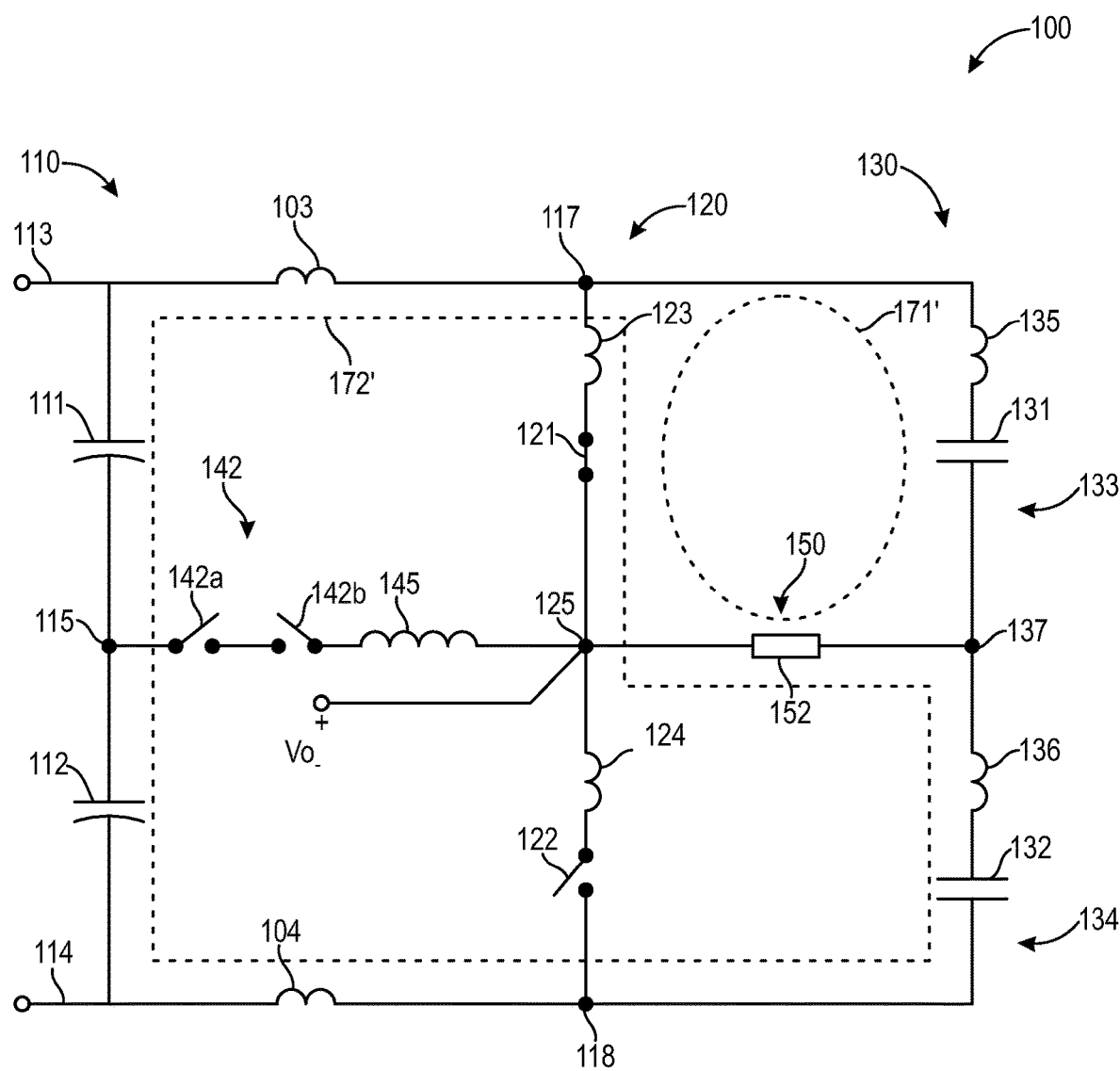
FIG. 3B is a schematic circuit diagram depicting certain aspects of another active damping operational state of the soft switching resonant converter circuitry of FIG. 1.

Starting at time $t_5$ and continuing to time $t_6$, the damper switch is controlled to be off (i.e., open) to provide relatively high resistance of a sufficient magnitude to damp current and voltage ringing in the soft switching resonant converter circuitry. This damping operation is illustrated in FIG. 3B and is analogous to but inverted relative to the state of operation illustrated in FIG. 3A with power switch 121 controlled to be on (i.e., closed), power switch 121 controlled to be off (i.e., open), and the active damper 150 being controlled to provide the resistance of damping resistor 152 to attenuate current and voltage ringing in a third loop 171' analogous to but inverted relative to the first loop 171, and a fourth loop 172' analogous to but inverted relative to the loop 172. Thus, comparing FIGS. 3A and 3B, it can be seen that the third loop 171' is on the opposite side of circuitry 100 from the first loop 171 and includes first power switch 121, the active damper 150, and the first commutation loop 133 (including the first resonant capacitor 131). Similarly, the fourth loop 172' is on the opposite side of circuitry 100 from the second loop 172 and includes the second DC link rail 114, the first power switch 121 the active damper 150, a portion of the second commutation loop 134 including the second resonant capacitor 132, the first DC link rail 113, and the DC link capacitors 111, 112. Starting at time $t_6$ (which may be considered a new time $t_0$) the foregoing description of signal timing diagram 200 repeats.

Figure 4:
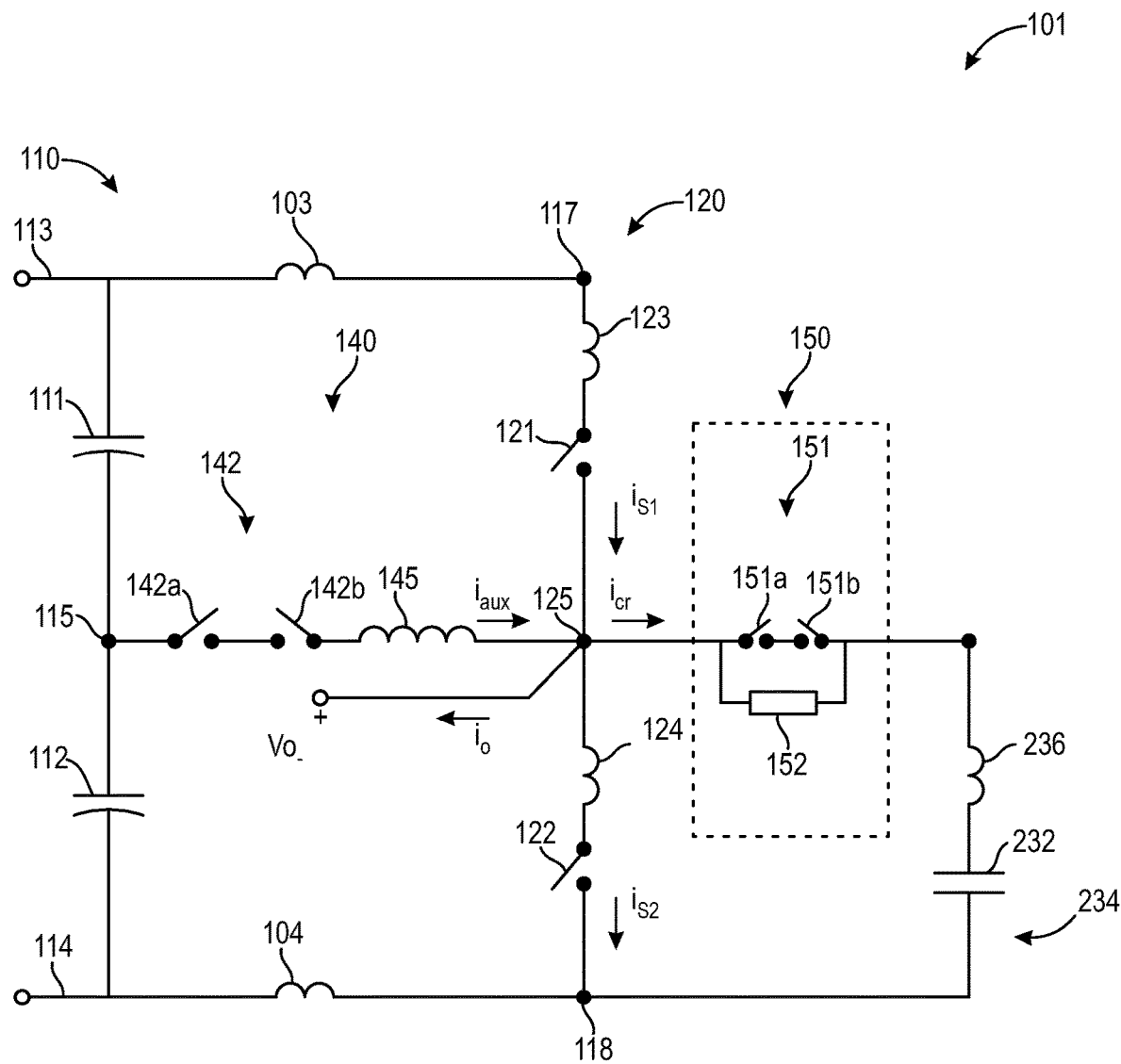
FIG. 4 is a schematic circuit diagram depicting certain aspects of soft switching resonant converter circuitry according to another example embodiment

With reference to FIG. 4, there is illustrated a schematic diagram depicting certain aspects of example circuitry 101 which is configured as an additional example of an ARCPI. In other embodiments, circuitry 101 may be configured as a number of other types of soft switching resonant converters including the examples described in connection with circuitry 100. Circuitry 101 includes a number of elements that are the same as or substantially similar to corresponding elements of circuitry 100. Such elements are indicated with the same reference numerals utilized in connection with circuitry 100 and FIG. 1 and it shall be appreciated that the foregoing description of these elements in connection with circuitry 100 applies to the corresponding elements of the circuitry 101. Circuitry 101 also differs from circuitry 100 in certain respects. For instance, the commutation section of circuitry 101 includes a single resonant capacitor 232 coupled in parallel with the second power switch 122 to provide a commutation loop 234. The resonant capacitor 232 includes an ESL 236 which is an inherent or parasitic inductance of the resonant capacitor 232 rather than a discrete inductor. The resonant capacitor 232 is configured to provide soft switching functionality for both power switch 121 and power switch 122 and, accordingly, is sized to provide twice the capacitance as either resonant capacitor 131 or resonant capacitor 132 individually.

Figure 5:
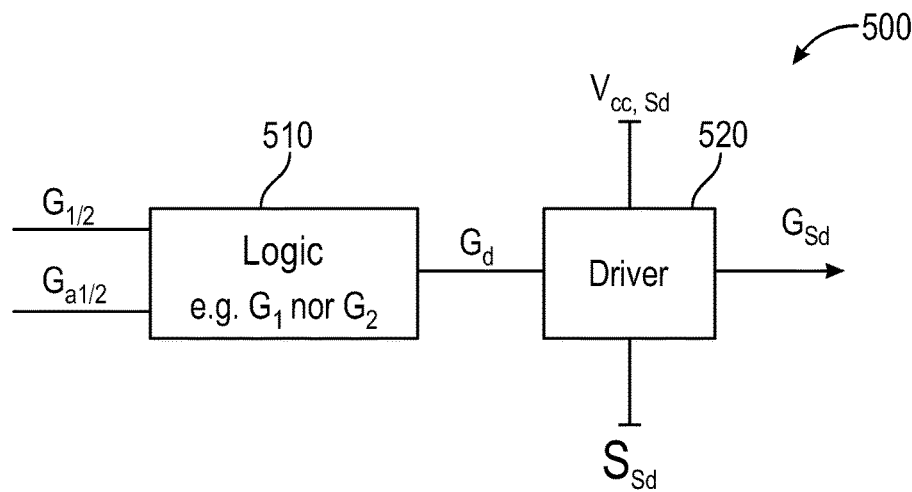
FIG. 5 is a schematic circuit diagram depicting certain aspects of example control and driving circuitry.

With reference to FIG. 5, there is illustrated an example embodiment of driver circuitry 500. In the illustrated example of driver circuity 500, the gating signal ($G_{Sd}$) for a damping switch $S_d$ (e.g., damping switch 150 of circuitry 100) is generated from the gating signals of the main switch G1 or the main switch G2 ($G_{1/2}$) and auxiliary switch $G_{a1}$ or $G_{a2}$ ($G_{a1/2}$). Since the damping switch $S_d$ only needs to be on during the dead or steady-state time of first and second power switches, such as power switches 121 and 122 of circuitry 100, or when the commutation resonant current flows through the resonant capacitors 133 and 134, control logic 510 can be utilized to implement a logical NOR operation on the gating signals for the power switches (G1 NOR G2) in order to generate a gating driver control signal $G_d$ which is provided to damper gating driver 520. In response to this signal, the gating driver 520 generates a damper switch gating drive signal $G_{Sd}$ which is provided to drives the gates of the damping switch $S_d$ (e.g., the gates of switching devices 151a, 151b of circuitry 100). The gating driver 520 also receives a damper switch power supply voltage $V_{cc, Sd}$ and a power supply source voltage $S_{Sd}$ which are utilized by gating driver 520 in generating the damper switch gating drive signal $G_{Sd}$. It shall be appreciated that some delay circuitry may be required to align the switching timings for implementation in practice.

Driver circuitry 500 is one example of a damper driver operatively coupled with and configured to control a damper switch such that the damper switch is in a first state during the soft switching operation of the power switch and the damper is in the second state once the soft switching operation of the power switch is completed. It shall be appreciated that in other embodiments control and driver circuitry 500 may be provided in a number of different forms. The control logic 510 may be provided in a number of forms including, for example, microprocessor or microcontroller-based forms which execute instructions stored in a non-transitory memory medium, arrangements of logic gate circuitry, arrangements of analog circuitry, field programmable gate arrays (FPGAs), and combinations of these and/or other forms of control logic. In certain forms, the control logic 510 may utilize other logic to identify the dead or steady-state time of the power switches. In certain forms, the control logic 510 may utilize sensed or measured current and voltage signals associated with power switches (e.g., power switches 121, 122), load currents and voltages (e.g., current $i_o$ and voltage $v_o$), and/or currents and voltages associated with other elements or nodes of a soft switching resonant converter from which the operation of the power switches can be determined or identified. In such forms, a field programmable gate array (FPGA) may be utilized to process the sensed or measured current and voltage values. It shall be further appreciated that embodiments which utilize a tri-state device as a damping switch will include additional control circuitry in accordance with the topology of a given tri-state device.

Figure 6:
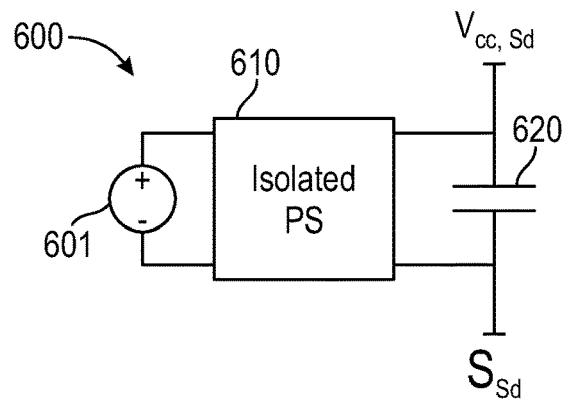
FIGS. 6 and 7 are schematic circuit diagrams depicting certain aspects of example power supply circuitry.

With reference to FIG. 6, there is illustrated an example embodiment of an isolated gate driver power supply 600. In the illustrated embodiment, power supply 600 includes voltage source 601 which is specific and dedicated to supplying power for the damper switch of soft switching resonant converter circuitry, such as damper switch 150 of circuitry 100. Power supply 100 further includes isolation circuitry 610 which may include one or more transformers or other core and winding arrangements configured to transfer power from voltage source 601 in an isolated manner without using a conductive current path between voltage source 601 and the other illustrated circuitry of power supply 600. Power supply 600 further includes a supply capacitor 620, damper switch power supply voltage ($V_{cc, Sd}$) output, and a power supply source or reference voltage ($S_{Sd}$). It shall be appreciated that power supply 600 is isolated from one or more additional power supplies utilized to drive power switches, such as power switches 121, 122, and/or auxiliary switches, such as auxiliary switch 142.

Figure 7:
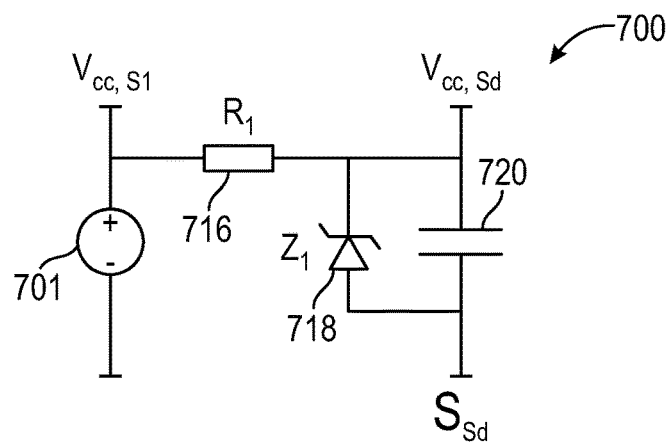

With reference to FIG. 7, there is illustrated an example embodiment of a non-isolated gate driver power supply 700. In the illustrated embodiment, power supply 700 draws power from a voltage source 701 which is configured to supply power to a power switch, such as one or more of power switches 121, 122 of circuitry 100. Because the damper switch and the power switch do not consistently have a common source, additional circuitry may be utilized to accommodate the use of a common voltage supply among these switches. In operation periods other than ringing damping (e.g., all periods other than those between times $t_2$ and $t_3$ or the period between times $t_5$ and $t_6$ of signal timing diagram 200), there is a commonality of the source $S_{Sd}$ of the damping switch $S_d$ and the source $S_{S1}$ of the power switch $S_1$ and both sources have the same potential since they are connected through either the damping switch $S_d$ or the damping resistor $R_d$. As such, the power can be delivered to the damping switch driver from the power supply for the power switch driver. During the ringing damping periods (e.g., the periods between times $t_2$ and $t_3$ and between times $t_5$ and $t_6$ of signal timing diagram 200), the potential of the damping switch driver $S_{Sd}$ could be much lower than the potential of the power switch driver $S_{S1}$ due to a voltage drop on the damping resistor $R_d$ under ringing current conditions, which could damage the driver. To limit the current surge, the positive rails of the two power supplies are connected through resistance R1 of resistor 716 a Zener diode 718 is used to clamp any surge voltage above the design driving voltage.

A number of aspects of the example embodiments disclosed herein shall now be further described. A first example embodiment is a power converter comprising: a power switch coupled with a DC link rail node and an output node and operable to connect and disconnect the DC link rail node and the output node; a resonant capacitor coupled with the power switch; an active damper coupled in series with the resonant capacitor and the output node, the active damper including a damper switch controllable to provide a first resistance of the active damper in a first state and a second resistance of the active damper in a second state, the first resistance having a lower magnitude than the second resistance; and a damper driver operatively coupled with and configured to control the damper switch so that the damper switch is in the first state during soft switching operation of the power switch and the damper switch is in the second state after the soft switching operation of the power switch is completed.

A second example embodiment includes the features of the first example embodiment wherein the damper driver is configured to control the damper switch so that the damper switch is in the first state prior to initiation of the soft switching operation of the power switch.

A third example embodiment includes the features of the first example embodiment or the second example embodiment wherein the damper driver is configured to control the damper switch so that the damper switch is switched to the first state concurrently with the beginning of the soft switching operation of the power switch.

A fourth example embodiment includes the features of any of the first through third example embodiments wherein the damper driver is configured to control the damper switch so that the damper switch is switched to the second state concurrently with the end of the soft switching operation of the power switch.

A fifth example embodiment includes the features of any of the first through fourth example embodiments wherein the resonant capacitor is coupled in parallel with the power switch.

A sixth example embodiment includes the features of any of the first through fifth example embodiments wherein the damper switch comprises a bi-directional switching device.

A seventh example embodiment includes the features of the sixth example embodiment wherein the bi-directional switching device a first silicon metal oxide semiconductor field effect transistor (Si MOSFET) and a second Si MOSFET coupled in series with opposing polarities.

An eighth example embodiment includes the features of any of the first through seventh example embodiments and comprises an auxiliary leg coupled in series with a DC link midpoint node and the output node, the auxiliary leg including an auxiliary switch and an inductor, the auxiliary switch operable to connect and disconnect the DC link midpoint node and the output node in coordination with operation of the power switch to provide soft switching of the power switch.

A ninth example embodiment includes the features of the eighth example embodiments and comprises a second power switch coupled with a second DC link rail node and the output node and operable to connect and disconnect the second DC link rail node and the output node; and a second resonant capacitor coupled with the second power switch.

A tenth example embodiment includes the features of any of the first through ninth example embodiments wherein the damper driver is configured to control the damper switch in response to gating signals for the power switch.

An eleventh example embodiment includes the features of the tenth example embodiments wherein the damper driver is configured to control the damper switch in response to sensed current and voltage values.

A twelfth example embodiment includes the features of any of the first through eleventh example embodiments wherein the active damper is configured to dampen ringing in a first current loop and a second current loop.

A thirteenth example embodiment includes the features of any of the first through twelfth example embodiments includes the features of any of the first through third example embodiments wherein the first current loop includes the power switch, the active damper, and the resonant capacitor.

A fourteenth example embodiment includes the features of any of the first through thirteenth example embodiments wherein the second current loop includes the power switch, the active damper, and a DC link capacitor.

A fifteenth example embodiment includes the features of any of the first through fourteenth example embodiments wherein the power switch has first voltage rating, the damper switch has a second voltage rating, and the first voltage rating is at least 5 times the second voltage rating.

A sixteenth example embodiment includes the features of any of the first through fifteenth example embodiments and comprises a non-isolated power supply operatively coupled with and configured to supply driving voltage for the power switch and the active damper.

A seventeenth example embodiment includes the features of the sixteenth example embodiment wherein the non-isolated power supply comprises a resistor operatively coupled with a voltage source at a first node and operatively coupled with a capacitor and a Zener diode at a second node, the capacitor and the Zener diode being operatively coupled in a parallel relationship.

An eighteenth example embodiment is a system comprising: a DC link including a first DC link rail node and a second DC link rail node; a first power switch coupled with a first DC link rail node and an output node and operable to connect and disconnect the first DC link rail node and the output node; a second power switch coupled with the output node and the second DC link rail node and operable to connect and disconnect the output node and the second DC link rail node; and a commutation loop coupled with the output node and one of the first DC link rail node and the second DC link rail node and including a resonant capacitor and an active damper, the active damper being controllable to vary a resistance of the commutation loop to a first resistance and a second resistance greater than the first resistance.

A nineteenth example embodiment includes the features of the eighteenth example embodiment wherein the active damper includes a bidirectional switch, the active damper providing the first resistance with the bidirectional switch is closed and providing the second resistance when the bidirectional switch is open.

A twentieth example embodiment includes the features of the nineteenth example embodiment wherein the first power switch has first voltage rating, the bidirectional switch has a second voltage rating, and the second voltage rating is 20% or less than the first voltage rating.

A twenty-first example embodiment includes the features of any of the eighteenth through twentieth example embodiments and comprises a second commutation loop operatively with the output node and other of the first DC link rail node and the second DC link rail node and including a second resonant capacitor and the active damper.

A twenty-second example embodiment includes the features of the twenty-first example embodiment wherein the active damper is controllable to dampen current and voltage ringing in the commutation loop, a first primary power path including the first power switch, the second commutation loop, and a second primary power path including the first power switch.

A twenty-third example embodiment is a method of controlling operation of a power converter, the method comprising: performing a soft switching operation including closing a first power switch to connect a first DC link rail node and an output node and opening a second power switch to disconnect a second DC link rail node and the output node; controlling an active damper to provide a non-damping resistance during the soft switching operation, the active damper being in a commutation loop including a resonant capacitor coupled with the output node; and controlling the active damper to provide a damping resistance after completion of the soft switching operation, the damping resistance being greater than the non-damping resistance, the damping resistance attenuating current and voltage ringing in the commutation loop and in a second loop including the first power switch.

A twenty-fourth example embodiment includes the features of the twenty-third example embodiment wherein the act of controlling the active damper to provide the non-damping resistance occurs prior to initiation of the soft switching operation.

A twenty-fifth example embodiment includes the features of the twenty-third example embodiment wherein the act of controlling the active damper to provide the non-damping resistance occurs concurrently with the initiation of the soft switching operation.

A twenty-sixth example embodiment includes the features of the twenty-third example embodiment wherein the act of controlling the active damper to provide the-damping resistance occurs concurrently with the end of the soft switching operation.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A power converter comprising:
a power switch coupled with a DC link rail node and an output node and operable to connect and disconnect the DC link rail node and the output node;

a resonant capacitor coupled in parallel with the power switch;

an active damper coupled in series with the resonant capacitor and the output node, the active damper including a damper switch, wherein the damper switch comprises a bi-directional switching device, the damper switch being configured to provide a first resistance of the active damper in a first state and a second resistance of the active damper in a second state, the first resistance having a lower magnitude than the second resistance;

a damper driver operatively coupled with and configured to control the damper switch so that the damper switch is in the first state during soft switching operation of the power switch and the damper switch is in the second state after the soft switching operation of the power switch is completed;

an auxiliary leg coupled in series with a DC link midpoint node and the output node, the auxiliary leg including an auxiliary switch connected in series with an inductor, the auxiliary switch operable to connect and disconnect the DC link midpoint node and the output node in coordination with operation of the power switch to provide soft switching of the power switch;

a second power switch coupled with a second DC link rail node and the output node and operable to connect and disconnect the second DC link rail node and the output node; and a second resonant capacitor coupled in parallel with the second power switch;

wherein the active damper is configured to dampen current and voltage ringing in a first current loop, a first primary power path including the power switch, a second current loop, and a second primary power path including the second power switch.

2. The power converter of claim 1 wherein the damper driver is configured to control the damper switch so that the damper switch is in the first state prior to initiation of the soft switching operation of the power switch.

3. The power converter of claim 1 wherein the damper driver is configured to control the damper switch so that the damper switch is switched to the first state concurrently with a beginning of the soft switching operation of the power switch.

4. The power converter of claim 1 wherein the damper driver is configured to control the damper switch so that the damper switch is switched to the second state concurrently with an end of the soft switching operation of the power switch.

5. The power converter of claim 1 wherein the bi-directional switching device includes a first silicon metal oxide semiconductor field effect transistor (Si MOSFET) and a second Si MOSFET coupled in series with the first Si MOSFET with opposite polarities.

6. The power converter of claim 1 wherein the damper driver is configured to control the damper switch in response to gating signals for the power switch.

7. The power converter of claim 1 wherein the damper driver is configured to control the damper switch in response to sensed current and voltage values.

8. The power converter of claim 1 wherein the first current loop includes the power switch, the active damper, and the resonant capacitor.

9. The power converter of claim 1 wherein the second current loop includes the power switch, the active damper, and a DC link capacitor.

10. The power converter of claim 1 wherein the power switch has first voltage rating, the damper switch has a second voltage rating, and the first voltage rating is at least 5 times the second voltage rating.

11. The power converter of claim 1 comprising a non-isolated power supply operatively coupled with and configured to supply driving voltage for the power switch and the active damper.

12. The power converter of claim 11 wherein the non-isolated power supply comprises a resistor operatively coupled with a voltage source at a first node and operatively coupled with a capacitor and a Zener diode at a second node, the capacitor and the Zener diode being operatively coupled in a parallel relationship.

13. A system comprising:
a DC link including a first DC link rail node and a second DC link rail node;

a first power switch coupled with the first DC link rail node and an output node and operable to connect and disconnect the first DC link rail node and the output node;

a second power switch coupled with the output node and the second DC link rail node and operable to connect and disconnect the output node and the second DC link rail node;

an auxiliary leg coupled in series with a DC link midpoint node and the output node, the auxiliary leg including an auxiliary switch connected in series with an inductor, the auxiliary switch operable to connect and disconnect the DC link midpoint node and the output node in coordination with operation of the first power switch to provide soft switching of the first power switch;

a first commutation loop coupled with the output node and one of the first DC link rail node and the second DC link rail node and including a first resonant capacitor coupled in parallel with the first power switch, and an active damper, the active damper being configured to vary a resistance of the first commutation loop to a first resistance and a second resistance greater than the first resistance; and a second commutation loop coupled with the output node and the other of the first DC link rail node and the second DC link rail node and including a second resonant capacitor coupled in parallel with the second power switch, and the active damper;

wherein the active damper includes a bidirectional switch, the active damper providing the first resistance when the bidirectional switch is closed and providing the second resistance when the bidirectional switch is open; and wherein the active damper is configured to dampen current and voltage ringing in the first commutation loop, a first primary power path including the first power switch, the second commutation loop, and a second primary power path including the second power switch.

14. The system of claim 13 wherein the first power switch has first voltage rating, the bidirectional switch has a second voltage rating, and the second voltage rating is 20% or less than the first voltage rating.

15. A method of controlling operation of a power converter, the method comprising:
providing a first commutation loop coupled with an output node and one of a first DC link rail node and a second DC link rail node and including a first power switch coupled in parallel with a first resonant capacitor, and an active damper, the active damper being configured to vary a resistance of the first commutation loop to a damping resistance and a non-damping resistance greater than the damping resistance;

providing an auxiliary leg coupled in series with a DC link midpoint node and the output node, the auxiliary leg including an auxiliary switch connected in series with an inductor, the auxiliary switch operable to connect and disconnect the DC link midpoint node and the output node in coordination with operation of the first power switch to provide soft switching of the first power switch;

providing a second commutation loop coupled with the output node and the other of the first DC link rail node and the second DC link rail node and including a second resonant capacitor and the active damper, the second commutation loop including a second power switch coupled in parallel with the second resonant capacitor;

performing a soft switching operation including closing the first power switch to connect the first DC link rail node and the output node and opening the second power switch to disconnect the second DC link rail node and the output node;

controlling the active damper to provide the non-damping resistance during the soft switching operation; and controlling the active damper to provide the damping resistance after completion of the soft switching operation, the damping resistance attenuating current and voltage ringing in the first commutation loop and in the second commutation loop;

wherein the active damper includes a bidirectional switch, the active damper providing the damping resistance when the bidirectional switch is closed and providing the non-damping resistance when the bidirectional switch is open; and wherein the active damper is configured to dampen current and voltage ringing in a first primary power path including the first power switch, and a second primary power path including the second power switch.

16. The method of claim 15 wherein the act of controlling the active damper to provide the non-damping resistance occurs prior to initiation of the soft switching operation.

17. The method of claim 15 wherein the act of controlling the active damper to provide the non-damping resistance occurs concurrently with an initiation of the soft switching operation.

18. The method of claim 15 wherein the act of controlling the active damper to provide the damping resistance occurs concurrently with an end of the soft switching operation.

* * * * *